Nov. 8, 1932.  A. S. CAMERON  1,886,939
OPTICAL APPARATUS
Filed May 21, 1928   3 Sheets-Sheet 2

Inventor:
ALEXANDER S. CAMERON
By E. K. Lundy
Att'y.

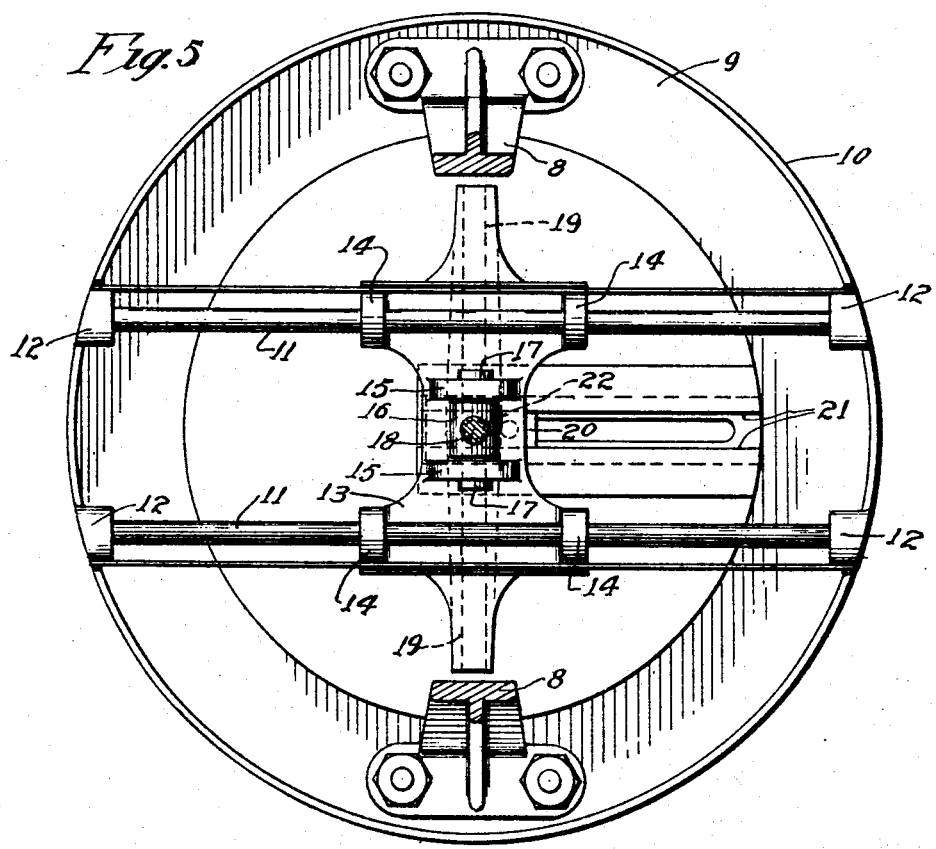
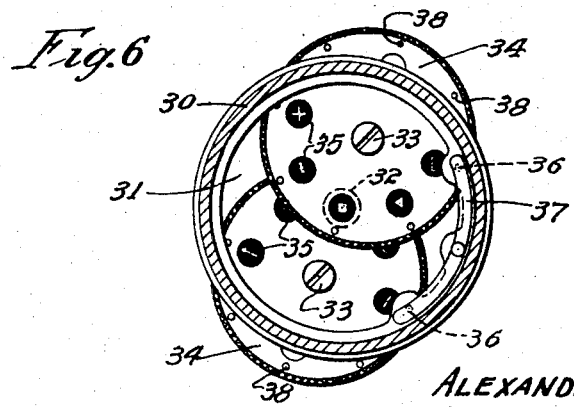
Inventor
ALEXANDER S. CAMERON.

Patented Nov. 8, 1932

1,886,939

UNITED STATES PATENT OFFICE

ALEXANDER S. CAMERON, OF CHICAGO, ILLINOIS, ASSIGNOR TO WILLIAM J. CAMERON, OF CHICAGO, ILLINOIS

OPTICAL APPARATUS

Application filed May 21, 1928. Serial No. 279,273.

In an application for United States Letters Patent for an "Instrument for examining, testing, and exercising the eyes", filed by me January 18, 1928, Serial Number 247,724, I have disclosed a structure wherein an image or spot of light is projected upon a screen to be observed by the patient. Means are provided in the said instrument to move the image projecting device in a variety of directions or paths so that the image may be moved either in a to and fro path upon the screen or may circumscribe a circular path or orbit, and adjustments may be made while the image and instrument are in motion to lengthen or shorten the distance traveled in the to and fro movement, the angle or inclination of such movement, and the diameter of the circumscribed movement or orbit. Changing the tone or color of the image or spot of light upon the screen is frequently desirable in the use of the instrument in certain cases especially when the image is moving upon the screen in its prescribed path.

My present invention provides means for modifying or changing the character of the light emitted from the projection elements of this apparatus and the parts of my invention are designed and assembled in a manner so that the light modification or color changes are made automatically and are accomplished while the apparatus is in motion so that it is not necessary for the operator or attendant to stop the mechanism to modify the character or tone of the light. I operate the light modifying devices by gravity or on the principle of a rolling disk within an annular or cylindrical housing or retainer that rotates upon its axis either in a fixed position or bodily moved in a circumscribed path or orbit, and the structure is made so that it is capable of being readily assembled with or detached from the instrument whenever desired.

I have numerous objects in mind in devising the structure above-mentioned, among which are, effectiveness and dependability in performance, readiness of operation, durability in construction, simplicity and sturdiness in the formation and arrangement of the parts, accessibility for the purpose of adjustment, and the whole device is arranged, fabricated, and assembled in a novel and economical manner, which permits the light modifier or color changing device being added to the instrument above referred to without materially increasing the manufacturing cost of the apparatus.

It is preferred to carry out my invention, and thereby accomplish the numerous objects thereof in substantially the manner hereinafter fully described, and as more particularly pointed out in the claims, reference being herein made to the accompanying drawings that form a part of this specification.

In the drawings:

Figure 5 is a vertical transverse section on line 5—5 of Figure 1, looking in the direction of the arrows.

Figure 6 is a vertical transverse section on line 6—6 of Figure 1 looking in the direction of the arrows.

It will be understood the drawings are more or less schematic in order to disclose a typical manner of carrying out my invention, and in these drawings the same reference characters have been employed to identify like parts wherever they appear.

Figure 1:
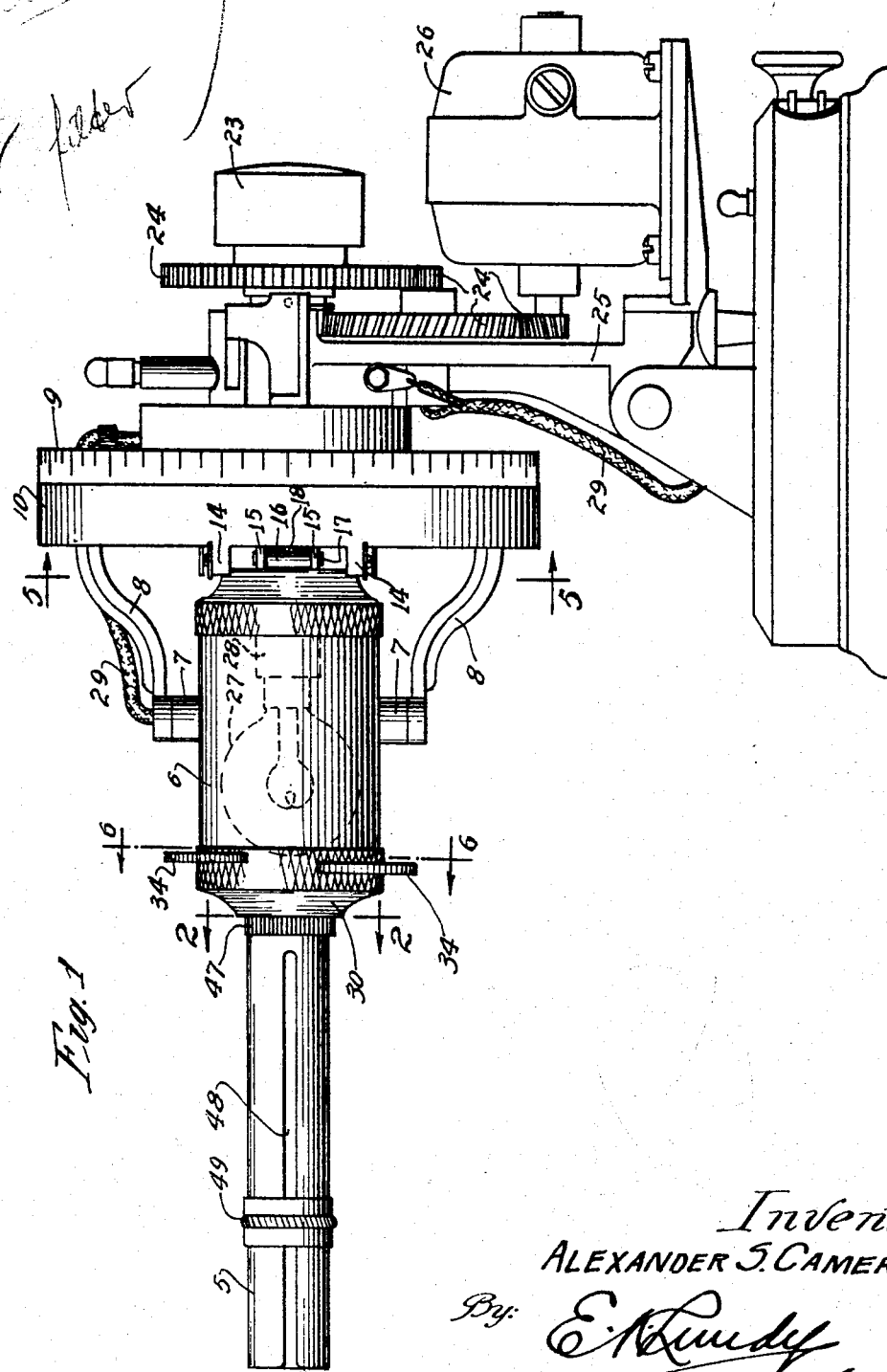
Figure 1 is a longitudinal side view of an instrument for projecting an image or spot of light upon a screen and for moving the same in a desired path, and shows my light modifying improvement incorporated thereon.

The instrument which I have disclosed is commercially and professionally known as a "myoculator" and includes a projection device consisting of a tube 5 extending outwardly from a housing 6 that is mounted by means of trunnions 7 upon the outer end of a pair of curved arms 8 that project from the head of the instrument. This head is in the form of a plate 9 of circular or disk-like shape having a lateral or peripherical flange or rim 10, and said head is adapted to be moved in the desired manner through the instrumentality of the actuating mechanism that is disclosed in my aforesaid application of Letters Patent Serial No. 247,724, such means having provision for rotating the tube and moving it bodily in a circular path.

The projection structure is adapted to be moved upon its trunnions 7 by means of a slide mechanism mounted on the head and connected operatively with the adjacent portion of the projection structure. The slide mechanism is readily adjustable for the purpose of controlling the length of movement of the outer end of the projector tube or the diameter of the circumscribed path traversed by the outer end of the tube, and the manner of making this adjustment is such that it may be readily accomplished during movement of the tube.

Guide rods 11 are mounted in parallel relation to each other in embossments 12 on the rim 10 and are slightly back of the edge of the rim, and upon these rods a spider 13 is movably mounted and consists of a casting having bored lateral bosses 14, projecting from one side thereof through which the rods 11 are positioned. Intermediate the rods the spider is provided with a pair of lateral lugs 15 between which a swivel-block 16 is pivotally mounted by means of shouldered bolts 17. The block has a transverse bore to receive a stud or quill 18 projecting axially from the rear end of the projection structure.

Figure 4:
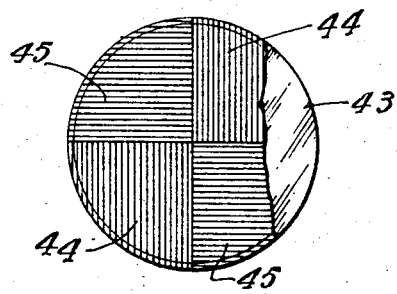
Figure 4 is a detail view of the light modifying element with a portion broken away.

In the position shown in Figures 1 and 4 the spider is directly back of the projection structure and in axial alinement therewith so that a rotation of the head will cause an axial rotation of the projector tube and the image or spot of light thrown upon the screen will rotate on a fixed axis and will not traverse a circumscribed path or orbit that is concentric with the axis of the head. When however the spider is moved radially from the center of the head towards the rim thereof it will tilt the projector tube upon its trunnions to a position where its axis is oblique to the axis of the head and upon the latter being rotated the outer end of the tube will describe a circular path concentric with the axis of the head thereby causing the image or spot of light upon the screen to move in a circular path upon the latter. On the surface of the spider opposite or back of the bosses and lugs is a channel 19 that extends in a plane at a right angle to the plane of movement of the spider, and a sliding block 20, moving in a gib-way or guide-tracks 21, has a projection 22, that operates in a channel 19 to adjust the position of the spider to tilt the projector tube. Suitable connection is made between the block 20 and an adjusting handle or hand grasp 23, which connection is such as that disclosed in my above mentioned application so that the operator may at any time adjust the position of the block by rotating the hand grasp.

The head has suitable operative connection with a train of gears 24 mounted upon the standard 25 of the instrument, and the gears are actuated by means of a motor 26, and this connection may be of any convenient construction, an exemplification of which is disclosed in my said application.

Within the rear portion of the projection structure or housing 6, is an electric lamp or bulb 27, mounted in a socket 28 and receiving its electric current from the conductor cable 29. In front of the lamp or bulb is a cap 30 that is screwed onto the housing and is provided with a transverse wall 31 in which a light aperture 32 is made and the outer portion of the cap is reduced in diameter, as shown in Figure 1, and is internally screw threaded to receive the adjacent end of the projector tube 5. Upon diametrically opposite sides of the aperture are pivoted screws 33 upon which are rotatably mounted the shutters or screens 34 so that they may be moved into different positions. There is a plurality of openings arranged concentrically about the axis of each shutter and the peripherial edges of the shutters project through slits in the cap 30 so that the shutters may be rotated from the exterior. The shutters overlap each other as shown in Figure 6 and the openings are arranged to be positioned in alinement with each other, as well as in alinement with the light aperture 32 in the cap. The openings in the shutters have cut-out stencils 35 fitted therein that are made in a variety of geometrical or conventional shapes as suggested in Figure 6 in order that images of different outlines may be projected upon the screen to be observed by the patient. The shutters 34 are yieldably maintained in their adjusted positions by means of projections 36 on the ends of a curved spring 37 mounted in the side-wall of the cap, which projections are adapted to seat in depressions 38 in the adjacent faces of the shutters.

Figure 2:
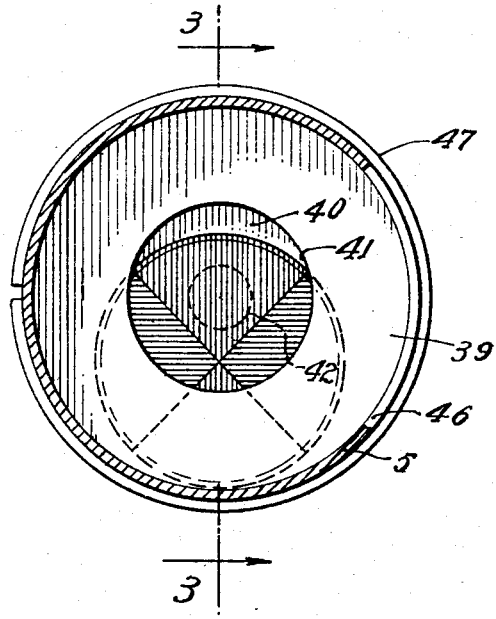
Figure 2 is a transverse section on line 2—2 Figure 1 showing details of the light modifiers and looking in the direction of the arrows.
Figure 3:
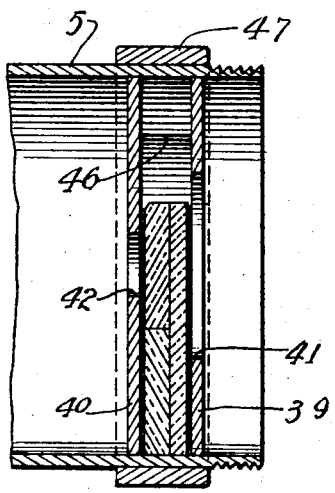
Figure 3 is a vertical axial section of the light modifiers, the view being taken on line 3—3 of Figure 2.

The light modifiers or color changing devices are disposed in front of the shutters and for convenience are shown as being mounted in the adjacent rear portion of the projector tube 5. For this purpose the rear portion of the tube is provided with a pair of parallel diaphragms or walls 39 and 40 that are spaced apart the desired distance to provide a chamber between them and are provided with axially alining apertures 41 and 42 respectively. Between these diaphragms is placed the light modifier element which, as shown in Figures 2, 3 and 4 consists of a base plate 43 that is preferably a circular disk of transparent or translucent material, such as glass to which is cemented a plurality of segments or sectors 44 and 45. These segments or sectors are respectively of different light modifying character and for the purpose of convenience are herein shown in the form of quadrants of glass of different colors, the parts 44 being of red glass and the parts 45 being of blue-glass.

The several parts are assembled as shown and cemented together to provide an integral unit or disk that is of a diameter greater than the distance from the inner wall of the tube to an opposite peripheral portion of the light aperture 42. Thus the light modifier, when placed in the chamber between the diaphragms 39 and 40 will rest upon the lowermost porton of the interior wall of the tube 5 and its upper edge, opposite its point of support, will be above the aperture 43 so that one of the quadrants 44 or 45 will be back of the aperture and the light passing therethrough will be modified or toned according to the particular sector that is in this position. When the tube is rotated by the head either upon its axis or is tilted and moved to describe a circle the disk forming this light modifier will roll by gravity upon the lowermost segment of the inner surface of the tube thereby bringing the quadrants successively back of the aperture 42 to change the tone or character of the light to the degree desired.

The quadrants are red and blue as above suggested. Any rotational movement of the tube 5 will cause the color of the spot of light or image upon the screen to be alternately changed from red to blue and vice-versa. When it is not desired to utilize the light modifiers or to change the color of the spot of light or image the disk may be removed by passing it through an elongated slot 46 made transversely in the wall of the tube, which slot is normally closed by a split sliding ring or annular band 47 that may be moved longitudinally on the tube to expose the slot.

It will be appreciated that plates of different density or light transmitting qualities may be used in lieu of the quadrants that are colored red and blue, so that the spot of light or image projected upon the screen will be changed from a bright to a dull tone.

There is a longitudinal slot 48 in projector tube 5 which permits a condensing lens unit carried by the adjusting ring 49 to be slidingly mounted therein, so that the light rays may be focused by the lens upon the screen and the image sharply defined or outlined for the patient's observation.

What I claim is:

1. A color changing device for optical instruments comprising a light source, a rotatable tube axially alined with said light source, spaced transverse walls associated with said tube and having alined light apertures of relatively different diameters, a disk having free peripheral rotation between said walls and with its axis below the axis of said tube, and a plurality of differently colored segments carried by said disk and adapted to be successively moved past said light apertures through the rotative action of said tube.

2. A color changing device for optical instruments comprising a light source, a rotatable tube axially alined with said light source, parallel partitions extending across the tube providing a narrow transverse chamber within the tube and having alined apertures of relatively different diameters, a disk movable within said chamber by rolling contact with the tube during rotation of the latter, and colored segments on said disk that are successively moved past said light apertures during rolling action of the disk.

3. A color changing device for optical instruments comprising a light source, a rotatable tube axially alined with said light source, parallel partitions extending across the tube providing a narrow transverse chamber within the tube and having alined apertures of relatively different diameters, a disk movable within said chamber by rolling contact with the tube during rotation of the latter, said disk being of less diameter than the interior diameter of the tube to position its axis below and eccentric to the axis of the tube, and colored segments on said disk that are successively moved past said light apertures during rolling action of the disk.

4. A color changing device for optical instruments comprising a light source, a rotatable tube axially alined with said light source, spaced transverse walls associated with said tube and having alined light apertures of relatively different diameters, and a disk disposed between said walls and consisting of a plurality of differently colored segments adapted to be successively moved across the axes of said light apertures through the rotative movement of said tube.

5. A color changing device for optical instruments comprising a light source, a rotatable tube alined axially with said light source, parallel partitions extending across said tube providing a narrow transverse chamber within the tube and having alined apertures of relatively different diameters, and a disk movable within said chamber by rolling contact with said tube during rotation of the latter, and guided by said partitions, said disk comprising complementary colored segments that are successively moved across the axes of said apertures during rotative movement of said tube.

6. A color changing device for optical instruments comprising a light source, a rotatable tube axially alined with said light source, an annular guide associated with said tube and formed with parallel transverse members having alined apertures of relatively different diameters, and a plurality of complementary colored segments forming a disk movable in said guide by rolling movement during rotation of the tube, whereby said segments are successively moved across the axes of said apertures during rolling action of said segments.

Signed at Chicago, in the county of Cook, and State of Illinois, this 30th day of April, 1928.

ALEXANDER S. CAMERON.